(12) United States Patent
Faitelson et al.

(10) Patent No.: US 10,628,460 B2
(45) Date of Patent: *Apr. 21, 2020

(54) DELEGATING RESEMBLING DATA OF AN ORGANIZATION TO A LINKED DEVICE

(71) Applicant: VARONIS SYSTEMS, LTD., Herzliya (IL)

(72) Inventors: Yakov Faitelson, New York, NY (US); Ohad Korkus, New York, NY (US); Ophir Kretzer-Katzir, Tenafly, NJ (US)

(73) Assignee: VARONIS SYSTEMS, LTD, Herzliya (IL)

( * ) Notice: Subject to any disclaimer, the term of this patent is extended or adjusted under 35 U.S.C. 154(b) by 160 days.

This patent is subject to a terminal disclaimer.

(21) Appl. No.: 16/044,523

(22) Filed: Jul. 25, 2018

(65) Prior Publication Data
US 2018/0329979 A1 Nov. 15, 2018

Related U.S. Application Data

(63) Continuation of application No. 13/909,107, filed on Jun. 4, 2013, now Pat. No. 10,061,836.

(51) Int. Cl.
*G06F 16/28* (2019.01)

(52) U.S. Cl.
CPC .................. *G06F 16/285* (2019.01)

(58) Field of Classification Search
CPC .................................................... G06F 16/285
See application file for complete search history.

(56) References Cited

U.S. PATENT DOCUMENTS

| | | | | |
|---|---|---|---|---|
| 7,640,363 B2 * | 12/2009 | Teodosiu | ................ | H03M 7/30 707/999.202 |
| 2002/0059440 A1 * | 5/2002 | Hudson | ................ | H04N 7/1675 709/231 |
| 2004/0059792 A1 * | 3/2004 | Tapola | ................ | G06F 16/1847 709/213 |
| 2004/0172423 A1 * | 9/2004 | Kaasten | ............... | G06F 16/1787 |
| 2005/0097441 A1 * | 5/2005 | Herbach | ................. | G06F 21/10 715/229 |
| 2008/0133526 A1 * | 6/2008 | Haitani | ................... | G06F 16/58 |
| 2008/0288738 A1 * | 11/2008 | Gokhale | ............... | G06F 3/0613 711/171 |
| 2009/0319534 A1 * | 12/2009 | Gokhale | ............. | G06F 16/1748 |
| 2010/0088317 A1 * | 4/2010 | Bone | ................... | G06F 16/1734 707/737 |
| 2012/0096013 A1 * | 4/2012 | Ciancutti | .............. | G06F 16/907 707/749 |
| 2014/0317054 A1 * | 10/2014 | Barton | ................ | G06F 11/1451 707/624 |

* cited by examiner

*Primary Examiner* — Jorge A Casanova
(74) *Attorney, Agent, or Firm* — Soroker Agmon Nordman

(57) ABSTRACT

A computerized method for pooling objects in a computerized system having a storage for objects, comprising identifying in the computerized system objects having an at least one common metadata entity associated with the objects, and including the identified objects in a pool of objects, and a apparatus for performing the same.

11 Claims, 4 Drawing Sheets

Prior Art

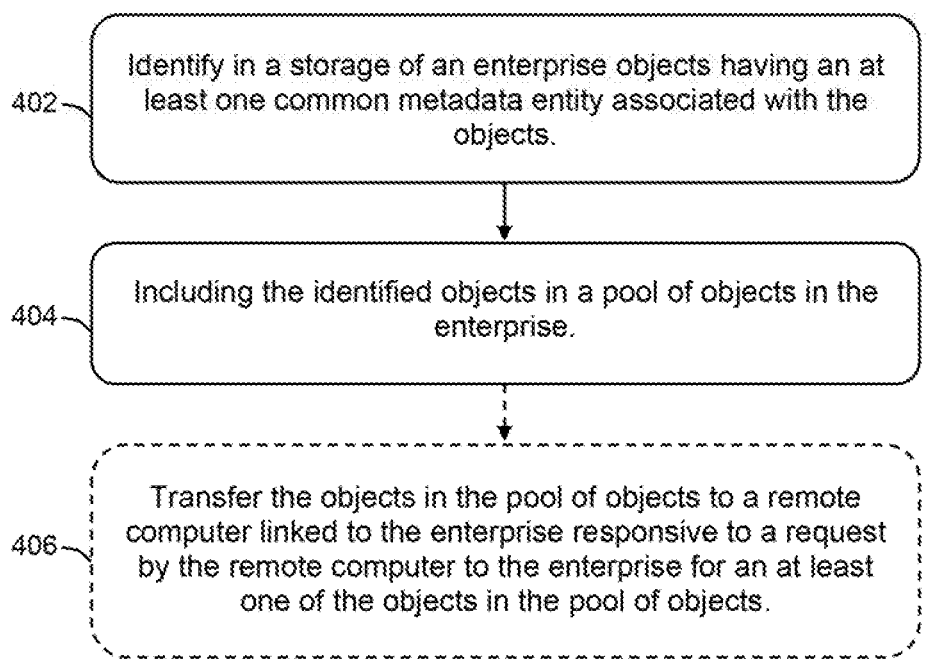

DELEGATING RESEMBLING DATA OF AN ORGANIZATION TO A LINKED DEVICE

BACKGROUND

The present disclosure generally relates to identifying resemblance between data objects of an organization, and more specifically to providing the data objects to a computerized device linked to the organization.

Clustering of objects based on a similarity therebetween is known, as, for example, US application No. 2006/0277184 that reports bi-clustering users and storage elements to define user clusters and data clusters, respectively, wherein the access profiles of the users in user clusters are mutually similar.

SUMMARY

One exemplary embodiment of the disclosed subject matter is a computerized method for pooling objects in a computerized system having a storage for objects, comprising identifying in the computerized system objects having an at least one common metadata entity associated with the objects, and including the identified objects in a pool of objects, wherein the method is performed on an at least one computerized apparatus configured to perform the method in the computerized system.

Another exemplary embodiment of the disclosed, subject matter is a computerized apparatus for pooling objects in a computerized system, comprising an at least one storage device comprised in the computerized system, and an at least one computer configured for identifying in the at least one storage device objects having an at least one common metadata entity associated with the objects and subsequently relating the identified objects in a pool of objects.

In the context of the present disclosure, without limiting, the term 'enterprise' or 'organization' implies a computerized system comprising a plurality of computers communicating therebetween and having and/or sharing a data storage, where the enterprise or 'organization are also referred to as a 'computerized system' and the data storage also referred to as a 'storage'.

The communications between the computes may be direct and/or indirect. The data storage comprises one or more data storage devices.

Generally, without limiting, an enterprise comprises several computers in a range between about 10 computers and about 1000 computers or more. Optionally, an enterprise comprises less than 10 computers, not precluding having one computer as, for example, a mainframe computer.

Without limiting, in the context of the present disclosure with respect to art enterprise, the term 'object' implies a data object, such as a file or a folder or a record in database, stored on the storage of the enterprise, and also referred to as an object of the enterprise.

In the context of the present disclosure, without limiting, the terms 'attribute' or 'metadata' imply information about an object and/or of an object and/or characterizing an object. For example, permissions to access an object, classification of an objects or history of accessing an object. Metadata of an object is also referred to as associated with the object and objects are also referred to as having metadata.

For brevity and generality, without limiting, in the context of the present disclosure metadata is generally referred to in a plural form such as referring to a plurality of metadata entities, yet without precluding a metadata entity in the singular form.

For brevity and generality, without limiting, in the context of the present disclosure referring to metadata of an object implies also any attribute of the object and also elements such a name or part thereof of the object, contents or part thereof of the object and aspects such as meeting a condition by the object such as a search phrase.

In the context of the present disclosure, without limiting, the term 'user' or 'operator' implies a person, and/or a program operating on behalf of the person, that uses a resource of an enterprise, such as a computer of the enterprise. A user or operator is also referred to as user of the enterprise or operator of the enterprise, respectively.

In the context of the present disclosure, without limiting, the term 'access right' or 'rights' or 'sufficient rights' imply authorization for a user to access an object of an enterprise, whereas insufficient rights imply not having an authorization to access the object such as for opening or reaching the object for viewing. Referring generally or collectively to a permission or permissions for or to an object implies any kind of authorization including, possibly, sufficient and/or insufficient rights.

Generally and without limiting, the authorization or permissions, and/or other metadata or attributes such as classifications, are set by the management or administration of the enterprise and/or by owners of objects of the enterprise and/or by operators with special high level authorization, also known as super-users, including, possibly, program or programs operating on beheld thereof.

In some cases with respect to the context of the present disclosure, without limiting, the terms 'classification' and 'category' imply different concepts, such as "confidential" and "log", yet in some cases the terms may imply the same and/or a similar concept.

In the context of the present disclosure, without limiting, the term 'virtually' with respect to operation regarding objects implies art operation pertaining or related to the object yet performed outside the object without affecting the objects and/or contents thereof, such as setting an entry referring to the object in an index.

It is noted that the terms cited above also denote and/or refer to inflections and conjugates of the cited terms.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1:
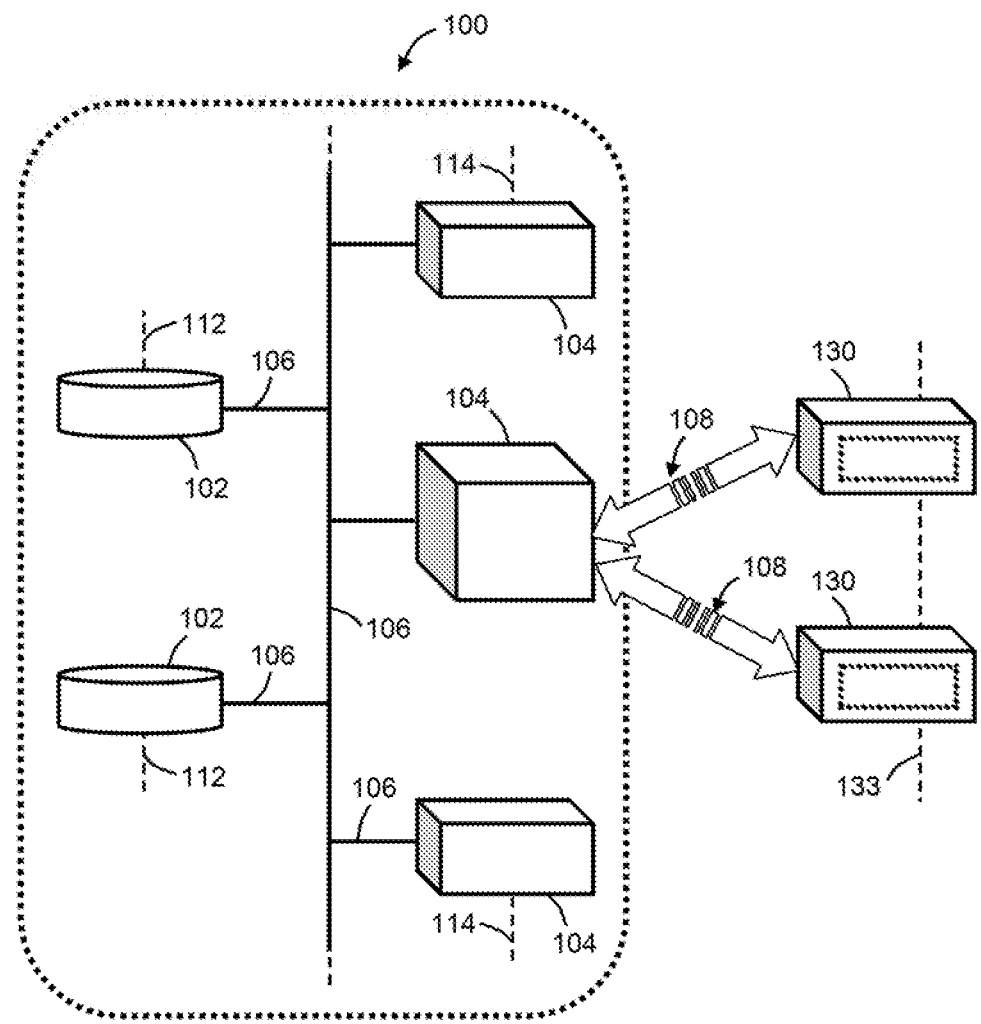

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2:
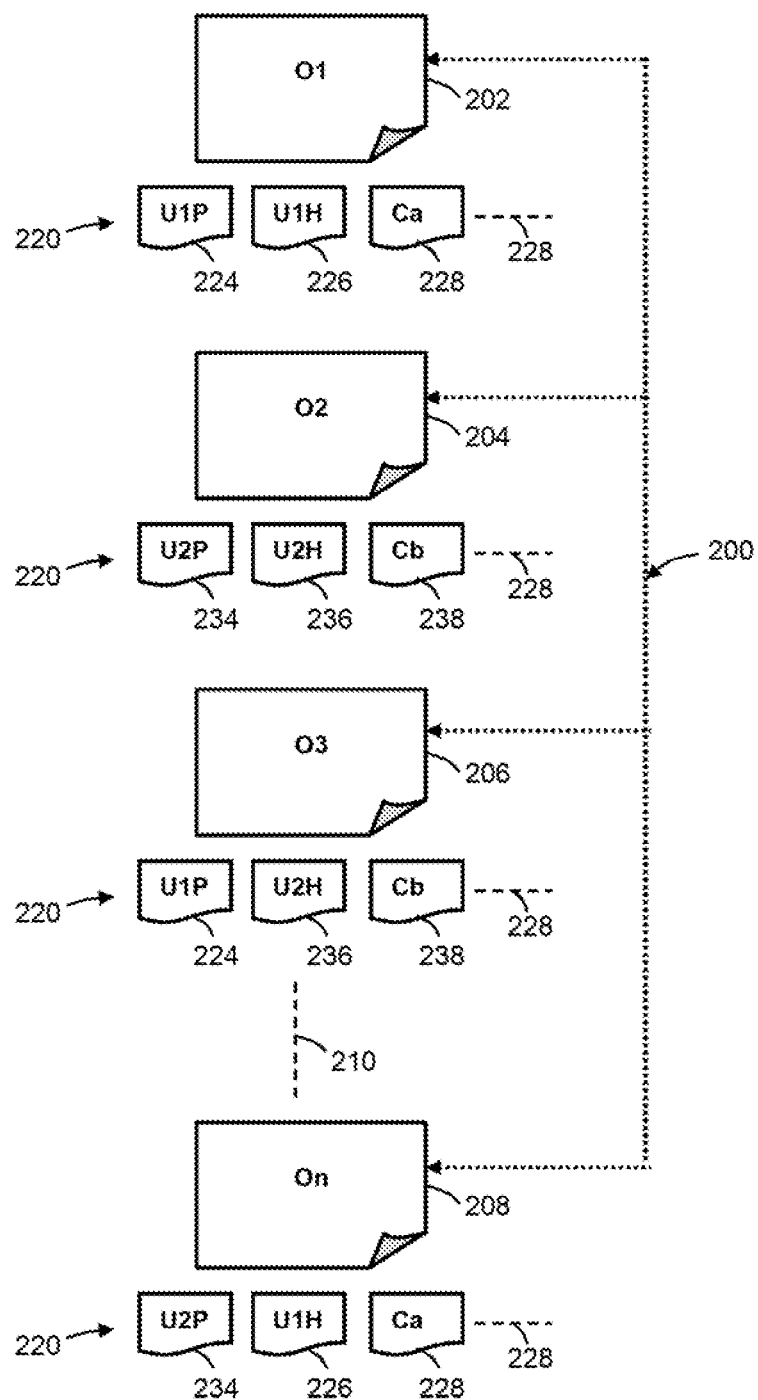
Figure 3:
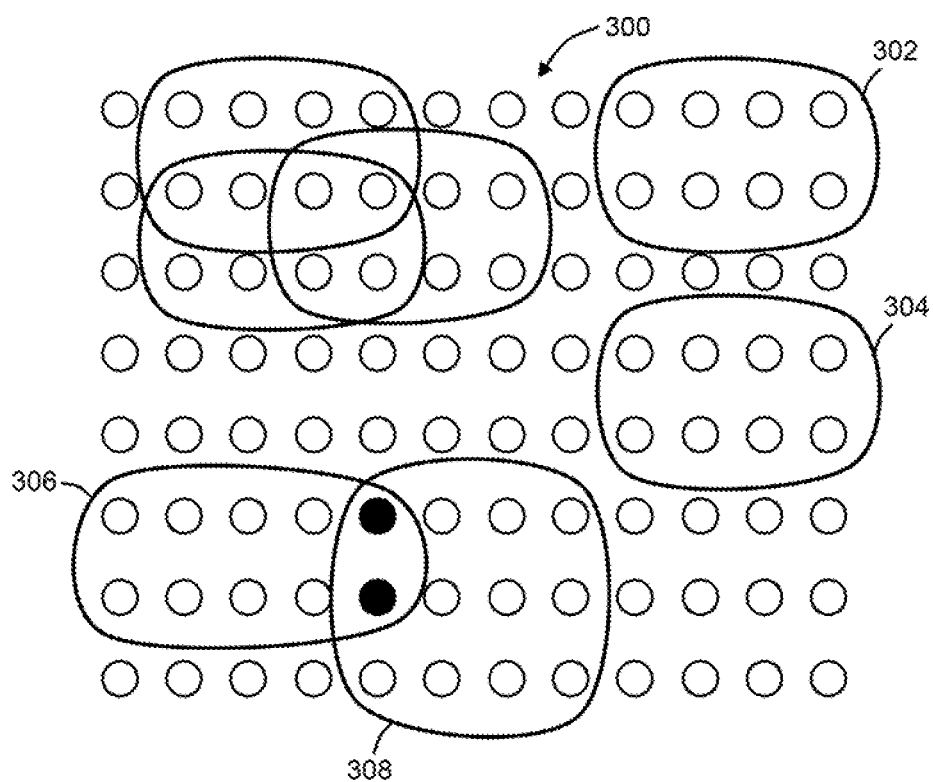

FIG. 1 schematically illustrates an enterprise with two remote computers connectable thereto, representing any number of remote computers;

FIG. 2 schematically illustrates objects and metadata entities thereof, according to exemplary embodiments of the disclosed subject matter;

FIG. 3 schematically illustrates objects of an enterprise pooled by resemblances, according to exemplary embodiments of the disclosed subject matter; and FIG. 4 outlines operations in pooling objects in an enterprise, according to exemplary embodiments of the disclosed subject matter.

DETAILED DESCRIPTION

One technical problem dealt by the disclosed subject matter is how to enhance accessibility to data objects of an organization by a remote computer linked to the organization.

A remote computer linked to an organization may access and obtain data objects of the organization for locally handing of the data objects on the remote computer. For example, as described in U.S. application Ser. No. 13/369,307 and PCT application No. PCT/IL2012/050043, both of which filed on Feb. 9, 2012.

A user operating the remote computer may require or request data objects of the organization to be retrieved to the remote computer. Individually locating data objects in the organization, at least potentially, involves undue overhead of time and efforts, and retrieving to the remote computer individual objects, at least potentially, involves undue communications overhead.

One technical solution according to the disclosed subject matter is an organization having one or more storage devices that store data objects. Data objects are identified as having mutual and/or similar attributes or metadata at least to some extent, wherein at least some of the identified data objects are not necessarily accessible to a user of a remote computer according to access permissions thereof.

The identified data objects are marked, at least virtually, such that upon a request for or a retrieval of one or more of the marked data objects by the remote computer, all the marked data objects are transferred to the remote computer.

An exemplary aspect of the solution is a probabilistic pre-fetch of data objects expected, at least potentially, to be required by the user of the remote computer.

Thus, in some embodiments, based on the resemblance between the data objects, once a data object is required by or retrieved to the remote computer, resembling data objects of the organization are transferred en masse to the remote computer and are ready for local access on the remote computer, avoiding, at least potentially and/or probabilistically, individual locating and transfer of subsequent data items.

In some embodiments, data objects are considered as resembling when certain conditions regarding attributes or metadata thereof are met. For example, when users of data objects have at least one common permission for the objects with a permission of another user, or when users have access history to data objects, at least recently, similar to that of another user, or when data objects have the same category or classification, or other conditions such as or when data objects contain identical or mutual data such as keywords, and/or any combination thereof.

A potential technical effect of the disclosed subject matter is a rapid access by a remote computer to a multiplicity of data objects of an organization without excessive time and/or communications overhead.

A general nonlimiting overview of practicing the present disclosure is presented below. The overview outlines exemplary practice of embodiments of the present disclosure, providing a constructive basis for variant and/or alternative and/or divergent embodiments, some of which are subsequently described.

FIG. 1 schematically illustrates an enterprise 100 with two of remote computer 130 connectable thereto via two of communication link 108, the two of remote computer 130 and two of communication link 108 representing any number of remote computers and possible communication links, respectively, as indicated by a dashed line 133.

Enterprise 100 comprises one or more computers, illustrated as three instances of a computer 104, representing any number of computer 104, as indicated by dashed lines 114.

Enterprise 100 further comprises one or more storage devices, illustrated as two instances of a storage device 102, representing any number of storage device 102, as indicated by dashed lines 112. Storage device 102 generally stores objects or data entities such as files or database records or users definitions or similar elements, collectively referred to as objects.

The instances of computer 104 are connected or linked or coupled therebetween and to the instances of storage device 102, the connection or linkage illustrated and represented by a network 106.

In some embodiments, communication link 108 is an internet link, a wired link or a wireless link, or any other link operating by any protocol, or a combination thereof. It is noted that communication link 108 may comprise a variety of connections, not necessarily a permanent one, as long as remote computer 130 is operatively connectable with enterprise 100, such as by way of one of computer 104.

FIG. 2 schematically illustrates objects and metadata entities thereof, distributed on one or more of instances of storage device 102 of enterprise 100, according to exemplary embodiments of the disclosed subject matter.

The objects, denoted as object 202, object 204, object 206 and object 208, designated also as O1 ... On, respectively, represent any number of objects, as indicated by a dashed lie 210. For brevity and clarity, without limiting, the objects, namely O1 ... On, are collectively referred to also as objects 200, as indicated by the connected doted arrows.

Each of objects 200 has and/or associated with metadata 220, representing any number of metadata or metadata entities as indicated by dashed lines 228.

By way of example, metadata 220 comprise metadata 224, designated also as U1P denoting a permission designated a P for a user designated as U1, and similarly also metadata 234 designated also as U2P. Metadata 220 further comprise metadata 226, designated also as U1H denoting activity history designated a H for a user designated as U1, and similarly also metadata 236 designated also as U2H. Metadata 220 further comprise metadata 228, designated also as a classification Ca of object 202 and object 208, and similarly also metadata 238 designated also as a classification Cb.

It is noted that metadata, for example, metadata 224 or to that effect U1P, is also considered as a metadata entity, and so forth for metadata 234, metadata 226, metadata 236, metadata 228 and/or metadata 238.

As exemplarily illustrated, objects 200 have metadata 224, metadata 234, metadata 226, metadata 236, metadata 228 and metadata 239 as U1P, U2P, U1H, U2H, Ca and Cb which are partly shared therebetween. For example, O1 shares metadata U1P with O3, or O2 shares metadata Cb with O3. Based on the shared metadata, at least to some extent, objects 200 are considered as resembling objects and/or having a resemblance or resemblance therebetween.

In some embodiments, resembling objects are formed or collated or pooled or related included, at least virtually, into a pool, or are marked as such, according to the shared metadata or resemblance. For example, by assigning a common attribute to the resembling objects, or by entries respective to the objects in an index or a lookup table. A pool of resembling objects is referred to also as a resemblance pool or a pool. Thus, objects 200 collectively illustrate a pool.

In some embodiments, a plurality of resemblance pools is formed, where pools may be disjoint from each other, or one pool may overlap a second pool or a plurality of pools such as by having resemblance with part of the objects of the second pool or the plurality of pools.

At least in some embodiments, the pooled resembling objects are marked or designated as such by data external to the objects per se, without affecting and/or necessarily affecting the objects and/or contents thereof.

FIG. 3 schematically illustrates objects 300 of an enterprise, such as enterprise 100, pooled by resemblances as illustrated by curved enclosures, according to exemplary embodiments of the disclosed subject matter.

For examples, a pool 302 and a pool 304 are disjoint from any other pool as lacking any common resemblance, whereas a pool 306 and a pool 308 partially overlap each other having objects, shown as black circles, with shared resemblance with pool 306 and pool 308.

In some embodiments, an enterprise such as enterprise 100 for example, is configured to identify resembling objects, such as by one or more continuous process or processes and/or any other process or processes such as responsive to events. For brevity and clarity, the one or more processes are referred to also, without limiting, a process.

Enterprise 100 is configured to identify resembling objects by configuring and/or installing a programmed process in one or more of computer 104.

Resembling objects are identified by the process according to conditions or rules, referred to also collectively as rules, where in some embodiments, several rules are combined.

Some illustrative examples of rules for objects and associated metadata thereof are provided below for conveying the nature of the rules by way of examples.

Objects having the same permissions for users.
Objects sharing some one or more permissions to users
Objects accessed by users within a certain time, referred to also as access history or history.
Objects accessed by users in averagely the same occurrences within a certain time.
Objects having the same classification and/or category
Objects sharing the same owner and/or creator.
Objects stored in the same archive.
Objects sharing a predefined and/or a determined part of names thereof.
Objects sharing a predefined and/or a determined part of contents thereof.
Objects identified in a search criterion for contents thereof.

Other rules may be defined in addition or instead one or more of the runes exemplified above.

As noted above, in some embodiments, rules may be combined. For example, objects accessed by users within a certain time and having the same classification are pooled in a resemblance pool, or objects having the same permissions for users and identified in a search for contents thereof are pooled in a resemblance pool.

In some embodiments, the rules are predefined. Optionally or additionally, the rules are determined and/or modified responsive to the operation of the enterprise or as the enterprise is operating.

In some embodiments, the rules are set by an administrator of the enterprise and/or a program operation on behalf thereof. In some embodiments, pooling objects by resemblances is an ongoing process and pools of resembling objects may vary during the operation of enterprise 100.

Assuming, by way of example, that objects 200 as in FIG. 2 belong to a resemblance pool, and that user U1 is and/or also a user of one of remote computer 130 linked to enterprise 100.

In some embodiments, user U1 requests an object of enterprise 100 to be retrieved from enterprise 100 to remote computer 130, as an example object O1. Consequently all the objects, namely O1 . . . On, are sent to remote computer 130. Having retrieved objects O1 . . . On to remote computer 130, user U1 can access objects O1 . . . On locally on remote computer 130, even though user U1 does not have sufficient rights to access all of objects O1 . . . On enterprise 100.

An exemplary rationale for allowing user U1 to access all of objects O1 . . . On is that all of objects O1 . . . On share, at least partially, common metadata. Thus, it may be plausible that if user U1 is allowed to access a first subset of objects O1 . . . On and another user, user U2 for example, is allowed to access a second subset of objects O1 . . . On, then based on the resemblance of objects O1 . . . On user U1 would be allowed to access the second subset, at least locally on remote computer 130.

According to the cited exemplary rationale, in some embodiments, upon certain conditions and/or setting such as by an administrator of enterprise 100, based on the resemblance of objects O1 . . . On, user such as user U1 is allowed to access all of objects O1 . . . On in enterprise 100 even though user U1 does not have sufficient rights to access all or a subset of objects O1 . . . On.

FIG. 4 outlines operations in pooling objects in an enterprise, according to exemplary embodiments of the disclosed subject matter.

In operation 402 objects having an at least one common metadata entity associated with the objects are identified in a storage of an enterprise.

In some embodiments, objects are associated with a plurality of metadata entities where one or more of the plurality of metadata entities is common or shared, at least partly, by the objects, as for example, in FIG. 2 and respective description.

In some embodiments, as described above, the common or shared metadata associated with the objects is identified based on one or more rules for objects and associated metadata thereof.

In operation 404 the identified objects are included in a pool of objects in the storage of the enterprise.

In some embodiments, the objects are included virtually in a virtual pool, such as by setting an attribute or a property of the objects to indicated participation in a pool, or by setting an entry in and index of the enterprise respective to the objects to indicated participation in a pool.

In operation 406, optionally at least, the objects in the pool of objects are transferred to a remote computer linked to the enterprise in response to a request by the remote computer to the enterprise for an at least one of the objects in the pool of objects.

It is noted that according to at least partly shared metadata, a objects of the enterprise can be includes in a plurality of pools, where some objects may be included in a plurality of pools.

The enterprise is, for example, an enterprise such as enterprise 100, representing any computerized system having a storage such as one or more storage devices and one or more computerized apparatus such as a computer or a processor.

The method and/or operations described above are performed on one or more of the computerized apparatus configured to perform the method and/or operations in the computerized system such as the enterprise.

According to the present disclosure there is provided a computerized method for pooling objects in a computerized system having a storage for objects, comprising identifying in the computerized system objects having an at least one common metadata entity associated with the objects, and including the identified objects in a pool of objects, wherein the method is performed on an at least one computerized apparatus configured to perform the method in the computerized system.

In some embodiments, the objects are identified according to a plurality of common metadata entities.

In some embodiments, the objects are identified according to an at least one rule for objects and associated metadata entities thereof.

In some embodiments, the objects are identified according to a combination of a plurality of rules for objects and associated metadata entities thereof.

In some embodiments, the at least one common metadata entity is at least one of: permissions for users to the objects, access history by users to the objects, classification of the objects, category of the objects, owner of the objects, creator of the objects, archive of the objects, an at least a part of the names of the objects, contents of the objects or identification of the objects in a search.

In some embodiments, the method further comprising transferring the objects in the pool of objects to a remote computer linked to the computerized system responsive to a request by the remote computer to the computerized system for an at least one of the objects in the pool of objects.

In some embodiments, the method further comprising enabling to access in the computerized system the objects in the pool by an at least one user of the computerized system not having sufficient rights to access an at least one of the objects in the pool.

In some embodiments, the identified objects are virtually included in the pool.

According to the present disclosure there is provided a computerized apparatus for pooling objects in a computerized system, comprising an at least one storage device comprised in the computerized system, and an at least one computer configured for identifying in the at least one storage device objects having an at least one common metadata entity associated with the objects and subsequently relating the identified objects in a pool of objects.

In some embodiments, the apparatus further configured for transferring the objects in the pool of objects to a remote computer linked to the computerized system responsive to a request by the remote computer to the computerized system for an at least one of the objects in the pool of objects.

In some embodiments, the apparatus farther configured for enabling to access in the computerized system the objects in the pool by an at least one user of the computerized system not having sufficient rights to access an at least one of the objects in the pool.

In the context of some embodiments of the present disclosure, by way of example and without limiting, terms such as 'operating' or 'executing' imply also capabilities, such as 'operable' or 'executable', respectively.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus having one or more processors operable or operating according to a program.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a nontransitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated operations may occur in a different order or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" or "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

As used herein, ellipsis ( . . . ) between two entities or values denotes an inclusive range of entities or values, respectively. For example, A . . . Z implies all the letters from A to Z, inclusively.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A computerized method for receiving pooled objects in a remote computer from a storage of objects, the method comprising:
    in a remote computer, comprising a processor and a memory, configured to communicate over a communication network with a computerizing system comprising a storage of objects, sending by the processor a request from a user to the computerized system for objects stored in the storage based on objects identified in a search for contents thereof by a search phrase or a search criteria;
    receiving by the processor, pooled objects in a plurality of pools from the computerized system over the communication network; and
    providing by the processor, a rapid access to the pooled objects to the user;
    wherein the computerized system is configured to identify objects in the storage based on the request by the user, to identify based on one or more rules, resembling objects in the storage having at least one common metadata entity, and to virtually pool the objects into the plurality of pools according to metadata entities thereof common among groups of the identified resembling objects based on the one or more rules and another pool in the plurality of pools of objects based on the identified objects in the search, regardless of at least partial overlapping between pools in the plurality of pools; and
    wherein the objects have metadata entities that are pre-assigned and associated therewith by parties of the computerized system having sufficient authorization thereto.

2. The method according to claim 1, wherein the objects are pooled according to a combination of the one or more rules for objects and associated metadata entities thereof.

3. The method according to claim 1, wherein the metadata entities common among groups of the objects comprise at least one of: permissions for users to the objects, access history by users to the objects, classification of the objects, category of the objects, owner of the objects, creator of the objects, archive of the objects, and an at least a part of names of the objects.

4. The method according to claim 1, wherein the computerized system is configured to enable access by the processor to the pooled objects in the plurality of pools when the user does not have sufficient rights to access at least one of the pooled objects in the plurality of pools.

5. The method according to claim 1, wherein the computerized system is configured to enable access by the processor to all the objects in the plurality of pools by the user having sufficient rights to access at least one of the objects in the plurality of pools, while having insufficient rights to access other objects in the plurality of pools.

6. The method according to claim 1, wherein the computerized system is configured to virtually pool the objects based on at least one common permission for different users to the objects.

7. The method according to claim 1, wherein the computerized system is configured to virtually pool the objects based on similar access history per different users.

8. The method according to claim 1, wherein the computerized system is configured to virtually pool the objects based on at least one common metadata entity selected from a group consisting of: the same category, the same classification, including identical data, and including mutual data.

9. The method according to claim 1, wherein the computerized system comprises an enterprise.

10. A remote computer for receiving pooled objects from a computerized system, the computerized system comprising:
    a memory; and
    a processor configured to communicate over a communication network with a computerizing system comprising a storage of objects, to sending a request from a user to the computerized system for objects stored in the storage based on objects identified in a search for contents thereof by a search phrase or a search criteria, to receive pooled objects in a plurality of pools from the computerized system over the communication network; and to provide a rapid access to the pooled objects to the user;
    wherein the computerized system is configured to identify objects in the storage based on the request by the user, to identify based on one or more rules, resembling objects in the storage having at least one common metadata entity, and to virtually pool the objects into the plurality of pools according to metadata entities thereof common among groups of the identified resembling objects based on the one or more rules and another pool in the plurality of pools of objects based on the identified objects in the search, regardless of at least partial overlapping between pools in the plurality of pools; and
    wherein the objects have metadata entities that are pre-assigned and associated therewith by parties of the computerized system having sufficient authorization thereto.

11. The computerized system according to claim 10, wherein the computerized system is an enterprise.

* * * * *